US006761307B2

(12) United States Patent
Matsuoka (10) Patent No.: US 6,761,307 B2
(45) Date of Patent: Jul. 13, 2004

(54) FOLDING BOX FOR PACKING (75) Inventor: Takamine Matsuoka, Osaka (JP)

(73) Assignee: Daiichi Ohmiya Co., Ltd., Settsu (JP)

( * ) Notice: Subject to any disclaimer, the term of this patent is extended or adjusted under 35 U.S.C. 154(b) by 0 days.

(21) Appl. No.: 10/134,653

(22) Filed: Apr. 30, 2002

(65) Prior Publication Data
US 2002/0166887 A1 Nov. 14, 2002

(30) Foreign Application Priority Data

May 10, 2001 (JP) ........................................ 2001-139681

(51) Int. Cl.$^7$ ................................................ B65D 5/10
(52) U.S. Cl. ..................... 229/117; 229/198.2; 229/930; 229/5.81; 229/5.84
(58) Field of Search ................................ 229/117, 930, 229/198.2, 5.81, 5.84

(56) References Cited

U.S. PATENT DOCUMENTS

| 2,770,406 | A | * | 11/1956 | Lane ...................... 229/930 X |
| 3,240,845 | A | * | 3/1966 | Voelker .................. 229/930 X |
| 3,526,566 | A | * | 9/1970 | McElvain, Jr. et al. . 229/930 X |
| 3,649,398 | A | * | 3/1972 | Keith ..................... 229/930 X |
| 4,007,869 | A | * | 2/1977 | Stolkin et al. .............. 229/117 |
| 4,239,150 | A | * | 12/1980 | Schadowski et al. .... 229/198.2 |
| 4,284,228 | A | * | 8/1981 | Cetrelli .................... 229/198.2 |
| 5,316,165 | A | * | 5/1994 | Moran, Jr. ................... 220/62 |
| 5,690,274 | A | * | 11/1997 | Yang .......................... 229/117 |
| 5,927,593 | A | * | 7/1999 | Berkowitz et al. .......... 229/117 |

FOREIGN PATENT DOCUMENTS

JP    2002-145247    5/2002

* cited by examiner

Primary Examiner—Tri M. Mai
(74) Attorney, Agent, or Firm—Armstrong, Kratz, Quintos Hanson & Brooks, LLP.

(57) ABSTRACT

A folding box for packing made from a high density foam polypropylene resin board, in which the strength in a connecting portion is secured, durability is improved, and reusability is secured in addition to returnability and recyclability is provided.

A folding box for packing is made of high density foam polypropylene resin and contains a developed flat box forming board having two box forming bodies (P1) and (P2) respectively including a main face wall (2) extendedly provided on one lateral side thereof with a connecting piece (1), a side face wall (3), and extendedly provided bottom forming boards (4) and cover forming boards (5). A side edge of the bottom forming board (4) of the sub face wall (3) of the box forming bodies (P1) and (P2) is made to be an inclined edge (6) having a 45 degrees angle in respect with a border line between the sub face wall (3) and the bottom forming board (4), and the inclined edge (6) is extendedly provided with a folding connecting piece (9) having a line for bending into the shape of V (8) for erasing an effect of elastic memory of the high density foam polypropylene resin occurring in folding. Respective border lines of respective components of the box forming bodies (P1) and (P2) are made to be lines for bending into the shape of mountain (7) for erasing an effect of elastic memory of the high density foam polypropylene resin. A back surface of the folding connecting piece (9) extendedly provided to the bottom forming board (4) of the sub face wall (3) and a front surface of the bottom forming board (4) of the main face wall (2) opposing to the back surface are connected by heat and pressure-fusion.

2 Claims, 9 Drawing Sheets

FOLDING BOX FOR PACKING

BACKGROUND OF THE INVENTION

1. Field of the Invention

The present invention relates to a folding box for packing, which is made from a high density foam polypropylene resin board and used mainly as a folding box for packing for transporting things in the physical distribution industry and secondarily as a storage box for arranging things in order for the purpose of tidying up a room.

2. Description of the Related Art

In a recent industry field of living, there have been strong demands for natural environmental protection and for reasonable and economical utilization of limited resources. It is known that, in response to the above-described demand, there is a growing tendency to make an effort so that persons living lives, manufacturers of goods and users of goods would respectively cooperate each other.

Especially in the physical distribution industry, a conventionally used folding box for packing made of cardboard has a problem in weather resistance, durability and sanitary usage although a cost of used materials is cheep. Therefore, the folding structure of the above folding box is designed only for securing economy of space for storing and returnability in several times. The folding boxes are collected at a certain cost to make recycled paper or are incinerated, after being used several times until they cannot be used any more.

From the above point of view, the present inventor has developed a folding box for packing made from a high density foam polypropylene resin board in view of durability as well as light weight and low cost of the box and has already filed a patent application (No. 338632/2000) for the above folding box for packing and its manufacturing method and apparatus.

SUMMARY OF THE INVENTION

As described above, a folding box for packing made from a high density foam polypropylene resin board can satisfy demands for weather resistance, sanitary usage, light weight and durability as well as enable not only recycle but also long-term returnability and reuse to be achieved. It has been newly revealed, however, that the elastic characteristic of the above high density foam polypropylene resin board does not sufficiently contribute to reduction in volume of the folded boxes in storage and transportation (collection) and to improvement in efficiency of folding and assembling (into a three-dimension) operations.

This is caused by the elastic characteristic of the above-described material to be used and by difficulty of a high density foam polypropylene resin board in pretreatment of adhering (such as cleaning and surface-roughing treatments) and control of application of adhesive such that a connecting member such as a staple and an eyelet should be used for connecting overlapping surfaces of edges to be connected. Elastic memory operates on a bending part of the folded box, so that respective box forming bodies continuous at the bending parts would rise up toward a rising direction rather than overlap closely each other. The volume of the folded box thus becomes large, compared with a completely flatted condition (a condition of overlapping closely to be flatted). On the other hand, strength in supporting is required for assembling bottom forming boards. Therefore, in folding and assembling operations, the efficiency is deteriorated in assembling and flatting cover-forming boards and bottom forming boards, especially in assembling and flatting bottom forming boards.

In addition to the above, there is a danger that a careless operation would cause an operator to be damaged due to popping up of box forming bodies, for example. Moreover, the material to be used may be weakened by repeating assembly and disassembly for flatting of the bottom forming boards. These would cause difficulty in achieving returnability and reuse notwithstanding the usage of a high density foam polypropylene resin board.

There was a simple judgment that the above-described disadvantages caused by using a high density foam polypropylene resin board to form a folding box for packing can be solved by employing an auto bottom structure, which is popularly employed for a folding box for packing made of cardboard, (the structure in which bottom forming boards of a box are connected in advance in a flat shape so as to naturally form a horizontal bottom as they are when the box is assembled into a three-dimension) for a folding box for packing made from a high density foam polypropylene resin board. Simply employing the auto bottom structure, however, cannot solve the most of the above-described disadvantages.

That is, due to the auto bottom structure similar to that of a folding box for packing made of cardboard, elastic memory largely operates on a bending part of a folded box, so that respective box forming bodies, which are continuous at the bending parts, would rise up toward a rising direction, and thereby, the volume of the box becomes large even after flatting the box and the strength of the box decreases. This large volume and decreased strength may cause deterioration of the folding box for packing in economy of physical distribution, in packing functionality and in efficiency of a handling operation. Furthermore, as described above, there is a difficulty in adhering a high density foam polypropylene resin board by means of adhesion, so that the box cannot maintain the required strength unless a connecting member such as a staple and an eyelet is used. Thus, the elastic characteristic of a high density foam polypropylene resin board blocks solution of the above problems.

In a connecting operation by means of a staple or an eyelet, the boards should be connected by sandwich from both of the inside and the outside of a folding box since one of outside surfaces in respect with the overlapping surfaces forms an inner surface of the folding box. This makes the connecting operation very troublesome, and in addition, there are problems that the staples or eyelets are exposed inside and outside the box, so that the security in operation and the appearance of the box would be damaged and so that dust would be allowed to enter the box to contaminate the contents. Especially, there is a most important problem in recycling components of the box since components to be recycled are required to be of a single material while the above staples or eyelets are made of a different material from that of the components of the box.

The danger in the operation, the damage in appearance of the box and the most important problem in recycle can be solved by employing a high frequency welding method between overlapping surfaces of edges to be connected. This method, however, requires electrodes to be opposed each other on the inside and outside surfaces of the connecting part. Therefore, it is difficult to employ this method since the connecting operation would be troublesome and high frequency welding marks would be visually and clearly recognized on the outer surface of the box, which damages the appearance of the box, similarly to the case of connecting by means of staples and eyelets.

A purpose of the invention is to provide a folding box for packing, which is made from a high density foam polypropylene resin board, having an auto bottom structure as a bottom structure of the folding box for packing, the auto bottom structure being able to satisfy the weather resistance, sanitary usage, light weight and durability inherent in the high density foam polypropylene resin, to secure not only recycle but also long-term returnability and reuse, and to improve economy in physical distribution and efficiency of folding and assembling (into a three-dimension) operations in handling by reducing the volume of the folded box in storage and transportation (collection), without blocked by elastic memory or adhesiveness of the high density foam polypropylene resin.

The invention is to solve the above problems of the related art. Another purpose of the invention is to provide a folding box for packing made from a high density foam polypropylene resin board, in which strength is secured in a connecting part so as to improve the durability, and thereby, long-term returnability is achieved as well as reusability, the efficiency of the connecting operation in relative connecting parts and security in an operation are assured, deterioration in appearance is dissolved, and a single material is used to satisfy a requirement for recycle.

The folding box for packing in accordance with the invention includes two kinds of folding boxes for packing: a folding box for packing in accordance with a first invention, which is made of high density foam polypropylene resin and in which a developed flat box forming board includes four side walls forming a square trunk of the folding box and comprises two box forming bodies (P1) and (P2) respectively comprising a main face wall extendedly provided on one lateral side thereof with a connecting piece for forming the trunk, a side face wall connected with the other lateral side of the main face wall, bottom forming boards extendedly provided to respective lower edges of the above main face wall and the above sub face wall, and cover forming boards extendedly provided to respective upper edges of the above main face wall and the above sub face wall; and a folding box for packing in accordance with a second invention, which comprises one box forming body (P3).

A Folding Box for Packing in Accordance with a First Invention

Figure 1:
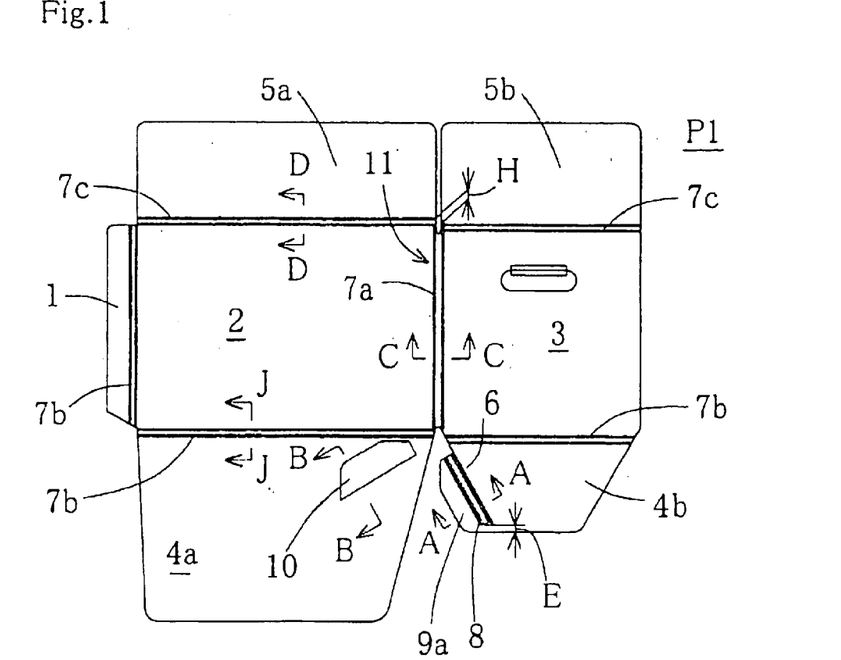
FIG. 1 is a front view of one of two unconnected box forming bodies (P1) according to Embodiment 1.
Figure 2:
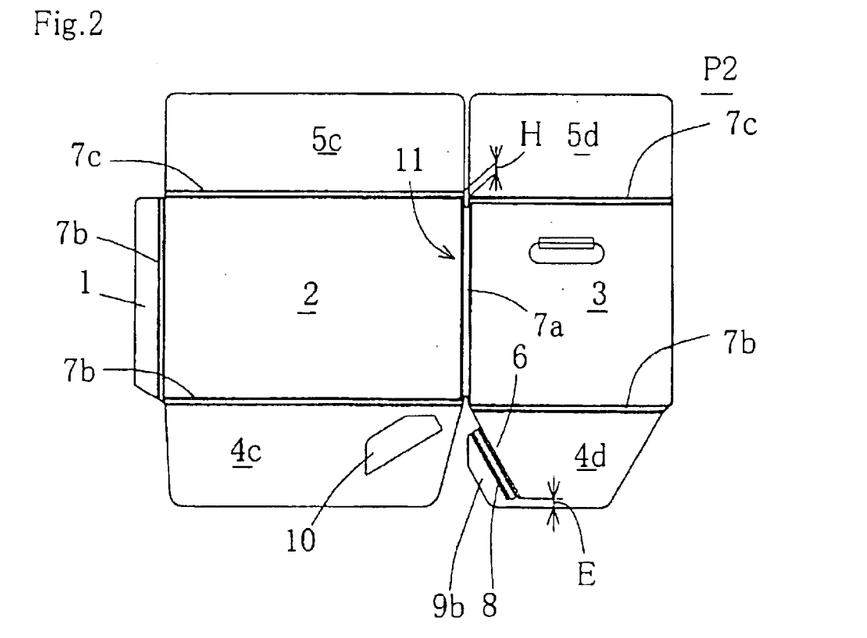
FIG. 2 is a front view of the other of two unconnected box forming bodies (P2) according to Embodiment 1.

The folding box according to the first invention includes a first box forming body (P1) and a second box forming body (P2), each of the box forming bodies (P1) (P2) respectively including: a main face wall (2) having a connecting piece (1) extending from a first lateral side of the main face wall (2); a sub face wall (3) extending from a second lateral side of the main face wall (2); a first bottom forming board (4a) (4c) extending from a lower edge of the main face wall (2); a second bottom forming board (4b) (4d) extending from a lower edge of the sub face wall (3); a first cover forming board (5b) (5d) extending from an upper edge of the sub face wall (3); the second bottom forming boards (4b) (4d) having a first folding connection piece (9a) and a second folding connection piece (9b), which connect the first bottom forming boards (4a) (4c) with the second bottom forming boards (4b) (4d) (refer to FIGS. 1 and 2).

A side edge of the bottom forming board (4b) (4d) of each sub face wall (3) of the above box forming bodies (P1) and (P2), is made to be an inclined edge (6) having a 45 degrees angle in respect with a border line between the above sub face wall (3) and the second bottom forming board (4b) (4d), and the above inclined edge (6) is extendedly provided with a first folding connecting piece (9a) and a second folding connecting piece (9b) having a line for bending into the shape of a V (8) for erasing an effect of elastic memory of the high density foam polypropylene resin occurring in folding, while respective border lines among the main face walls (2), the sub face walls (3), the cover forming boards (5a) (5b) (5c) (5d), the bottom forming boards (4a) (4b) (4c) (4d), and the connecting piece (1) of the above box forming bodies (P1) and (P2) are made to be lines for bending into the shape of a mountain for erasing an effect of elastic memory of the high density foam polypropylene resin occurring in folding and assembling the folding box.

And the above set of two box forming bodies (P1) and (P2) are mutually connected (refer to FIG. 9) by heat and pressure-fusion between a back surface of the sub face wall (3) of the first box forming body (P1) and a front surface of the connecting piece (1) of the second box forming body (P2) opposing the above back surface, between a back surface of the sub face wall (3) of the second box forming body (P2) and a front surface of the connecting piece (1) of the first box forming body (P1), between a back surface of the first folding connecting piece (9a) extendedly provided to the second bottom forming board (4b) and a front surface of the first bottom forming board (4a) of the main face wall (2) of the first box forming body (P1), opposing to the back surface of the first folding connecting piece (9a), and between a back surface of the second folding connecting piece (9b) extendedly provided to the second bottom forming board (4d) and a front surface of the first bottom forming board (4c) of the main face wall (2) of the second box forming body (P2), opposing to the back surface of the second folding connecting piece (9b), the back and front surfaces overlapping in a bottom forming structure in assembling the folding box.

The first invention is characterized in that lines for bending into the shape of a mountain (7c) are provided between the main face wall (2) and the first cover forming board (5a) of the first box forming body (P1), between the sub face wall (3) and the second cover forming board (5b) of the first box forming body (P1), between the main face wall (2) and the first cover forming board (5c) of the second box forming body (P2) and between the sub face wall (3) and the second cover forming board (5d) of the second box forming body (P2), including side grooves (74) on both sides of a middle groove (72) through partitions (73), and said side grooves (74) and said middle groove (72) are disposed on an exterior surface of the folding box; lines for bending into the shape of a mountain (7a) are provided between the main face wall (2) and the sub face wall (3) of each box forming body (P1) (P2), including two side grooves (74) parallel to a border line and a wide ridge (71a) between the two side grooves (74), a width of the wide ridge (71a) being about twice a thickness of the main face wall (2), and said side grooves (74) and said wide ridge (71a) are disposed on an exterior surface of the folding box; and lines for bending into the shape of a mountain (7b) are provided between the connecting pieces (1) and the main face walls (2), between the main face walls (2) and the first bottom forming boards (4a) (4c), and between the sub face walls (3) and the second bottom forming boards (4b) (4d), including two side grooves (74) parallel to a border line and a narrow ridge (71b) between the two side grooves (74), and said side grooves (74) and said narrow ridge (71b) are disposed on an exterior surface of the folding box.

A Folding Box for Packing in Accordance with a Second Invention

Figure 17:
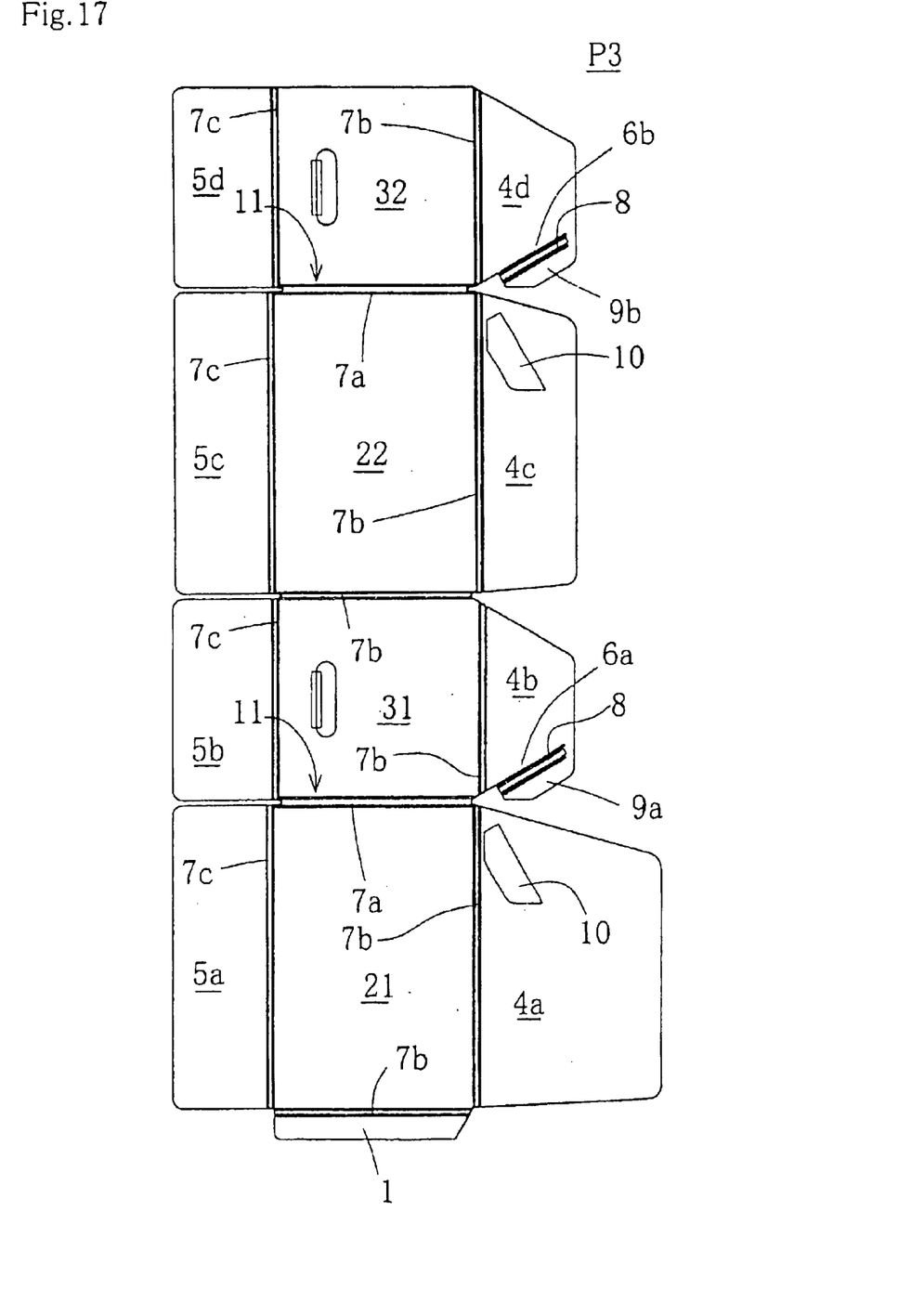
FIG. 17 is a front view of a box forming body (P3) of a folding box for packing in accordance with Embodiment 2.

The folding box for packing in accordance with the second invention is made of high density foam polypropylene resin, as clearly seen in FIG. 17, and in this folding box, a developed flat box forming board includes four side walls forming a square trunk of the folding box and comprises one developed box forming body.

The above one box forming body (P3) includes a first main face wall (21); a connecting piece (1) extending from a first lateral side of the main face wall (21); a first cover forming board (5a) extending from an upper edge of the first main face wall (21); a first bottom forming board (4a) extending from a lower edge of the first main face wall (21); a first sub face wall (31) extending from a second lateral side of the first main face wall (21); a second cover forming board (5b) extending from an upper edge of the first sub face wall (31); a second bottom forming board (4b) extending from a lower edge of the first sub face wall (31); a second main face wall (22) extending from a lateral side of the first sub face wall (31); a third cover forming board (5c) extending from an upper edge of the second main face wall (22); a third bottom forming board (4c) extending from a lower edge of the second main face wall (22); a second sub face wall (32) extending from a lateral side of the second main face wall (22); a fourth cover forming board (5d) extending from an upper edge of the second sub face wall (32); and a fourth bottom forming board (4d) extending from a lower edge of the second sub face wall (32), the second bottom forming board (4b) having a side edge made to be a first inclined edge (6a) having a 45 degree angle in respect with a border line between the first sub face wall (31) and the second bottom forming board (4b), the fourth bottom forming board (4d) having a side edge made to be a second inclined edge (6b) having a 45 degree angle in respect with a border line between the second sub face wall (32) and the fourth bottom forming board (4d), the first inclined edge (6a) being extendedly provided with a first folding connecting piece (9a), the second inclined edge (6b) being extendedly provided with a second folding connecting piece (9b).

The respective border lines among the respective main face walls (21) and (22), the respective sub face walls (31) and (32), the cover forming boards (5a) (5b) (5c) (5d), the bottom forming boards (4a) (4b) (4c) (4d), and the connecting piece (1) of the above box forming body (P3) are made to be lines for bending into the shape of a mountain for erasing an effect of elastic memory of the high density foam polypropylene resin occurring in folding and assembling the folding box.

A front surface of the above connecting piece (1) and a back surface of the second sub face wall (32) opposing to the above front surface are melted by heating, and back surfaces of the folding connecting pieces (9a) (9b) extendedly provided to the bottom forming boards (4b) (4d) of the above respective sub face walls (31) and (32) and front surfaces of the bottom forming boards (4a) (4c) of the main face walls (21) (22) opposing to the back surfaces of the folding connecting pieces (9a) (9b), the back and front surfaces overlapping in a bottom forming structure in assembling the folding box, are melted by heating, and then, the melted surfaces are superposed each other to be pressured, so that the back and front surfaces would be connected in such a fusion method.

[Effect of the First Invention]

According to the first invention, in a folding box for packing made of high density foam polypropylene resin with auto bottom structure including a first box forming body (P1) and a second box forming body (P2), each of the box forming bodies (P1) (P2) respectively including: a main face wall (2) having a connecting piece (1) extending from a first lateral side of the main face wall (2); a sub face wall (3) extending from a second lateral side of the main face wall (2); a first bottom forming board (4a) (4c) extending from a lower edge of the main face wall(2); a second bottom forming board (4b) (4d) extending from a lower edge of the sub face wall (3); a first cover forming board (5a) (5c) extending from an upper edge of the main face wall (2); and a second cover forming board (5b) (5d) extending from an upper edge of the sub face wall (3), wherein the second bottom forming board (4b) (4d) extending from the sub face wall (3) has a side edge adjacent to the first bottom forming board (4a) (4c) extending from the main face wall (2), the side edge being an inclined edge (6) having a 45 degree angle in respect with a border line between the sub face wall (3) and the second bottom forming board (4b) (4d), with the inclined edge (6) including a first folding connecting piece (9a) and a second folding connecting piece (9b) having a linear region bendable into the shape of a V (8) for reducing an effect of elasticity of the high density foam polypropylene resin occurring in folding, wherein the two box forming bodies (P1) (P2) are mutually connected by heat and pressure-fusion between a back surface of the sub face wall (3) of the first box forming body (P1) and a front surface of the connecting piece (1) of the second box forming body (P2), between a back surface of the sub face wall (3) of the second box forming body (P2) and a front surface of the connecting piece (1) of the first box forming body (P1), between a front surface of the first bottom forming board (4a) and a back surface of the first folding connecting piece (9a) of the first box forming body (P1) and between a front surface of the first bottom forming board (4c) and a back surface of the second folding connecting piece (9b) of the second box forming body (P2); the improvement comprising: lines for bending into the shape of a mountain (7c), between the main face wall (2) and the first cover forming board (5a) of the first box forming body (P1), between the sub face wall (3) and the second cover forming board (5b) of the first box forming body (P1), between the main face wall (2) and the first cover forming board (5c) of the second box forming body (P2) and between the sub face wall (3) and the second cover forming board (5d) of the second box forming body (P2), including side grooves (74) on both sides of a middle groove (72) through partitions (73), and said side grooves (74) and said middle groove (72) are disposed on an exterior surface of the folding box; lines for bending into the shape of a mountain (7a), between the main face wall (2) and the sub face wall (3) of each box forming body (P1) (P2), including two side grooves (74) parallel to a border line and a wide ridge (71a) between the two side grooves (74), a width of the wide ridge (71a) being about twice a thickness of the main face wall (2), and said side grooves (74) and said wide ridge (71a) are disposed on an exterior surface of the folding box; and lines for bending into the shape of a mountain (7b), between the connecting pieces (1) and the main face walls (2), between the main face walls (2) and the first bottom forming boards (4a) (4c), and between the sub face walls (3) and the second bottom forming boards (4b) (4d), including two side grooves (74) parallel to a border line and a narrow ridge (71b) between the two side grooves (74), and said side grooves (74) and said narrow ridge (71b) are disposed on an exterior surface of the folding box. Thus, the two box forming bodies (P1) and (P2) can be connected without using a different kind of members such as a staple and an eyelet, which would be an obstacle in recycle, so that it would be possible to provide a folding box for packing in which no staple and eyelet would be exposed outside, and thereby, a good appearance can be achieved.

Especially, it is possible to provide a folding box for packing in which further high durability superior in strength in connection and buckling can be achieved since the two box forming bodies (P1) and (P2) are connected in a plane by fusion into one body, and which can satisfy weather resistance, sanitary usage, light weight and durability of the high density foam polypropylene resin to secure not only recycle but also long-term returnability and reuse, as well as improve economy in physical distribution such as storage and transportation (collection) under a folded condition by reducing an effect of the elastic memory in bending the high density foam polypropylene resin to make the volume in folding small, and improve efficiency of folding and assembling (into a three-dimension) operations in handling.

Furthermore, a developed flat box forming board includes four side walls forming a square trunk of the folding box and comprises two box forming bodies (P1) and (P2) made of high density foam polypropylene resin and respectively comprising a main face wall (2) extendedly provided on one lateral side thereof with a connecting piece (1) for forming the trunk; a side face wall (3) connected with the other lateral side of the main face wall (2); bottom forming boards (4a) (4b) (4c) (4d) extendedly provided to respective lower edges of the above main face wall (2) and the above sub face wall (3); and cover forming boards (5a) (5b) (5c) (5d) extendedly provided to respective upper edges of the above main face wall (2) and the above sub face wall (3). Therefore, it is possible to easily produce the above respective box forming bodies (P1) and (P2), including respective portions provided thereto, without using any large dies.

[Effect of the Second Invention]

According to the second invention, the above two box forming bodies (P1) and (P2) in accordance with the first invention are formed as one box forming body (P3) comprising a first main face wall (21) extendedly provided on one side thereof with a connecting piece (1) for forming a trunk portion, a first sub face wall (31), a second main face wall (22) and a second sub face wall (32) in order. Therefore, it is possible to achieve the same operation and effect as the above first invention although a die for producing the box forming body would be large.

Effects of the structures of the folding box for packing according to the first invention and the folding box for packing according to the second invention are common in most parts. Thus, the operations and effects of the folding boxes for packing according to the both inventions can be described as follows by means of names of portions of the folding box for packing according to the first invention. That is, the line for bending into the shape of a V (8) includes a center groove (81) which is formed around a border line being to be a folding line and which has the width such that the folding member would not interfere each other, and auxiliary grooves (82), which are narrower than the width of the above center groove (81) and which are formed parallel on the folding surface side and on the both sides of the center groove (81) (refer to FIG. 3). Therefore, it is possible to reduce projection and interference due to bending of the member on the closely overlapping surface side of the above line for bending into the shape of a V (8), so that the effect of the elastic memory of the high density foam polypropylene resin can be erased to make the volume in folding lower.

Further, the line for bending into the shape of mountain (7a) (7b) includes two parallel side grooves (74) and a ridge (71a) (71b) therebetween formed along a border line being to be a line for bending into the shape of a mountain (refer to FIGS. 5 and 6), so that the side grooves (74) would intercept stretch memory operating on the bending part of the line for bending into the shape of mountain (7a) (7b), and thereby, the effect of the elastic memory of the high density foam polypropylene resin can be erased. In this arrangement, combined with the above arrangement, the thickness in folding can be maintained to be lower to keep the volume down.

Figure 9:
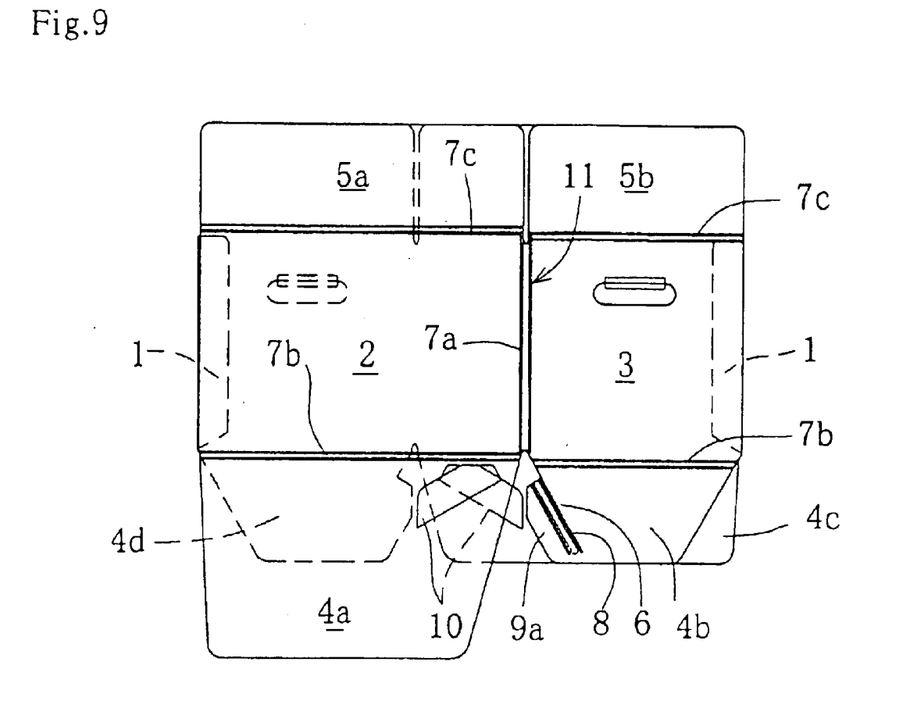
FIG. 9 is a front view of two box forming bodies (P1) and (P2) connected by means of a connecting piece (1) into a flat shape.

As clearly shown in FIGS. 1, 2 and 9, the folding connecting piece (9a) (9b) extendedly provided to the inclined edge (6) having a 45 degrees angle in respect with the border line between the sub face wall (3) and the bottom forming board (4b) (4d) is extendedly provided so that a base end portion of the inclined edge (6), the base end portion being located closely to the above border line, would be left. Thus, the folding connecting piece (9a) (9b) is not sandwiched between the base end portions of the bottom forming board (4b) (4d) of the sub face wall (3) and the bottom forming board (4a) (4c) of the main face wall (2) in folding, so that the folding connecting piece (9) would not interfere with overlap of the bottom forming board (4b) (4d) of the sub face wall (3) and the bottom forming board (4a) (4c) of the main face wall (2). Therefore, the bottom forming boards (4a) (4b) (4c) (4d) at the above portion, the sub face walls (3), and the main face walls (2) are overlapped into a roughly piled layer, so that the volume due to the effect of the elastic memory at the above portion would be further reduced, and thereby, the volume increased at the above portion by inserting a member can be dissolved to assure flatting.

Further, a concave for fusion (10) in the shape of an outline of the folding connecting piece (9a) (9b) is formed on a front surface of the bottom forming board (4a) (4c) of the main face wall (2), the front surface overlapping a back surface of the folding connecting piece (9a) (9b) in assembling, and the back surface of the folding connecting piece (9a) (9b) is fused on the surface of the concave for fusion (10) (mainly refer to FIGS. 1 and 11), so that the folding connecting piece (9a) (9b) would enter into the above concave for fusion (10) to be fused. Thus, the thickness of the folding connecting piece (9a) (9b) sandwiched between the bottom forming board (4b) (4d) of the sub face wall (3) and the bottom forming board (4a) (4c) of the main face wall (2) is substantially thin while the bottom forming board (4b) (4d) of the sub face wall (3) and the bottom forming board (4a) (4c) of the main face wall (2) are overlapped into a rough piled layer. In this condition, the volume due to the effect of the elastic memory at the above portion would be reduced, and therefore, the cause of increase in volume can be further dissolved, so that the flatting degree in folding can be advanced.

Furthermore, lines for bending into the shape of a mountain (7a), the lines formed at the border lines between the respective main face walls (2), (21) and (22) and the respective sub face walls (3), (31) and (32) respectively adjacent to the main face walls (2), (21) and (22), including two parallel side grooves (74) and a ridge (71a) between the two side grooves (74) and forming corner portions (11) in folding, have the width of the ridge (71a) between the above two side grooves (74) around twice as wide as the wall thickness (refer to FIG. 5), so that a portion with large thickness of a piled layer, which is formed inside the above corner portion (11) in folding, that is, a portion with thickness of a piled layer, which is formed by a rough piled layer of the bottom forming board (4b) (4d) of the sub face wall (3), the bottom forming board (4a) (4c) of the main face wall (2) and the folding connecting piece (9a) (9b), would be covered by the ridge (71a) widened between the above two side grooves (74). Therefore, the effect of the elastic memory at the above portion can be reduced, which would greatly contribute to maintenance of flatting in folding.

Figure 6:
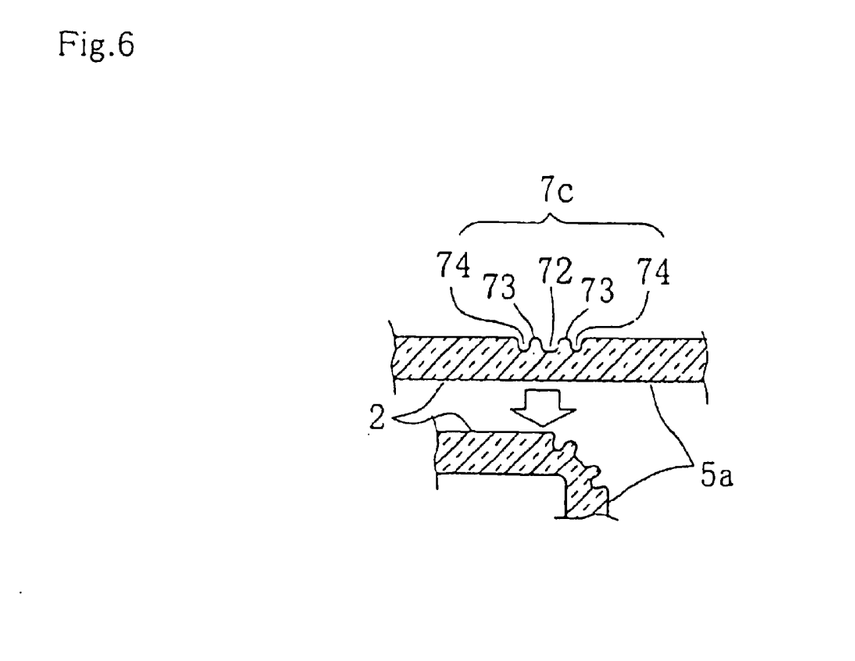
FIG. 6 is partially sectional views of a line for bending into the shape of a mountain (7c) of a cover forming board (5a), which show an enlarged partial section along a line D—D in FIG. 1 and an enlarged partial section of the bent line.

Moreover, among the lines for bending into the shape of mountain (7c) between the respective face walls of the box forming bodies (P1) and (P2) and the cover forming boards (5a) (5b) (5c) (5d) and between the respective face walls and the bottom forming boards (4a) (4b) (4c) (4d), at least the former includes a middle groove (72), which is formed around a border line being to be a line for bending into the shape of a mountain (7c) and which has the width for erasing elastic memory of a member for folding, and side grooves (74), which are narrower than the width of the above middle groove (72) and which are formed parallel on the both sides of the middle groove (72), as clearly shown in FIG. 6. Thus, in the case of assembling into a three-dimension the folding box for packing having been folded into a flat shape, the cover forming boards (5a) (5b) (5c) (5d) operate so as to intercept the effect of the elastic memory by means of the middle grove (72) and the side grooves (74) on the both sides thereof. As a result, the cover forming boards (5a) (5b) (5c) (5d) lie down to open the box in the case of storing or taking out things while they lie down to close the box in the case of closing the covers. Thus, in operations of storing things and closing the covers in packing and operations of opening the covers and taking out things in taking out stored things, the cover forming boards (5a) (5b) (5c) (5d) do not disturb the above operations, so that smooth and efficient storing and taking out operations can be performed.

The folding box for packing has an auto bottom structure similarly in the both cases that the developed flat box forming board made of high density foam polypropylene resin comprises one box forming body (P3) and that it comprises two box forming bodies (P1) and (P2). For example, a punching blade or a thermal tooth form is used to punch the outline of the box forming body, and following to this or at the same time, a thermal tooth form is used to form lines for bending into the shape of V (8) and for folding into the shape of a mountain (7a) (7b) (7c) and concaves for fusion (10). Then, a front surface of the connecting piece (1) forms a space of a rough V-shaped side groove (74) together with a back surface of the sub face wall (3), and only opposing surfaces in this condition are heated by hot wind blowing or die heating (regardless of materials, but preferably formed from a metal plate in the view of a characteristic in manufacturing a die) before press and fusion for connection.

Next, the two box forming bodies (P1) and (P2) connected in a flat shape or one box forming body (P3) are or is assembled in a three-dimension so as to form a square cylindrical trunk, and set in an operational cradle so that the square cylinder portion of the trunk would cover the cradle. Then, the bottom forming boards (4a) (4c) of the main face walls (2) (21) (22) are bent toward the inner side in advance to be set in the operational cradle, and the bottom forming boards (4b) (4d) of the sub face walls (3) (31) (32) are bent toward the front surfaces of the above bottom forming boards (4a) (4c) of the main face walls (2) (21) (22) so as to overlap the bottom forming boards (4a) (4c) of the main face walls (2) (21) (22).

Figure 11:
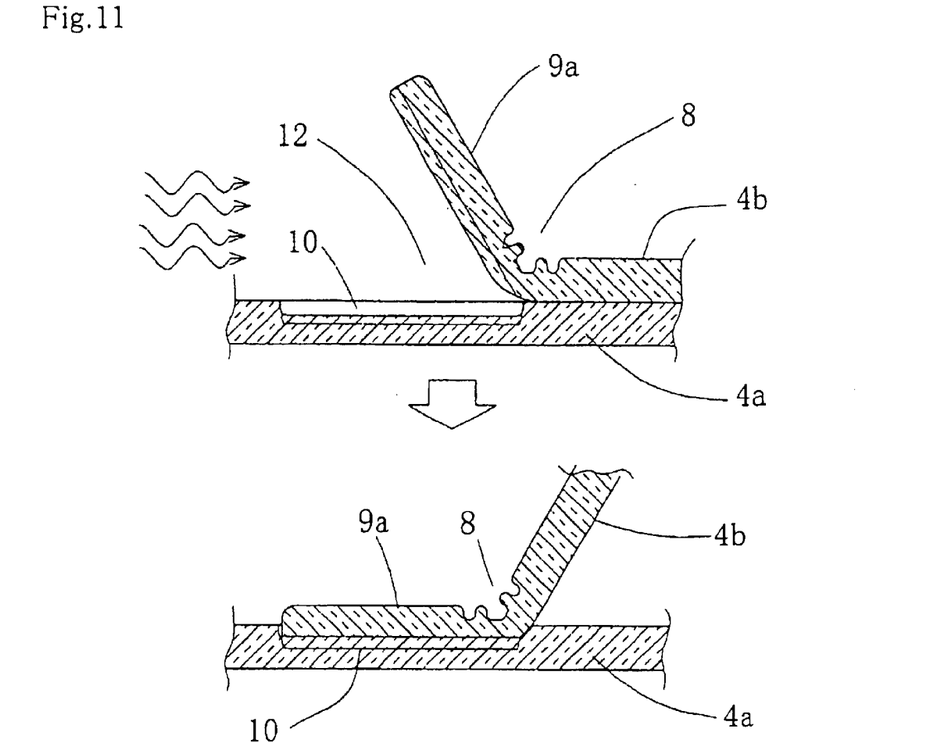
FIG. 11 includes enlarged sectional views illustrating connection by fusion between a trapezoid bottom forming board (4b) of a sub face wall (3) and a bottom forming board (4a) of a main face wall (2).

As clearly shown in FIG. 11, the folding connecting piece (9a) (9b) extendedly provided on the lateral side of the bottom forming board (4b) (4d) of the sub face wall (3) (31) (32) is raised up, using a line for bending into the shape of a V (8) as a standard line of rising, so that an angle between a back surface of the above folding connecting piece (9a) (9b) and a front surface of the bottom forming board (4a) (4c) of the main face wall (2) (21) (22) would be sharp, and so that the so formed space of a rough V-shaped groove (12) would be maintained. In this condition, only the back surface of the folding connecting piece (9a) (9b) and the front surface of the bottom forming board (4a) (4c) of the main face wall (2) (21) (22) are heated by the above-mentioned hot wind blowing or die heating to the extent that only surface portions respectively used for adhering are melted, and then, pressure-fused to complete a folding box for packing having an auto bottom structure.

The hot wind blowing or die heating and a pressure processing after heating for fusion between the front surface of the above connecting piece (1) and the back surface of the sub face wall (3) (32) opposing to the front surface of the connecting piece (1) and between the back surface of the folding connecting piece (9a) (9b) and the bottom forming board (4a) (4c) of the main face wall (2) (21) (22) are carried out either in an automatic process or in a manual process.

BRIEF DESCRIPTION OF THE DRAWINGS

Other features and advantages of the present invention will appear more clearly upon reading the following detailed description, made with reference to the annexed drawings in which.

DETAILED DESCRIPTION OF THE INVENTION

DESCRIPTION OF THE PREFERRED EMBODIMENT

Embodiment 1

Figure 15:
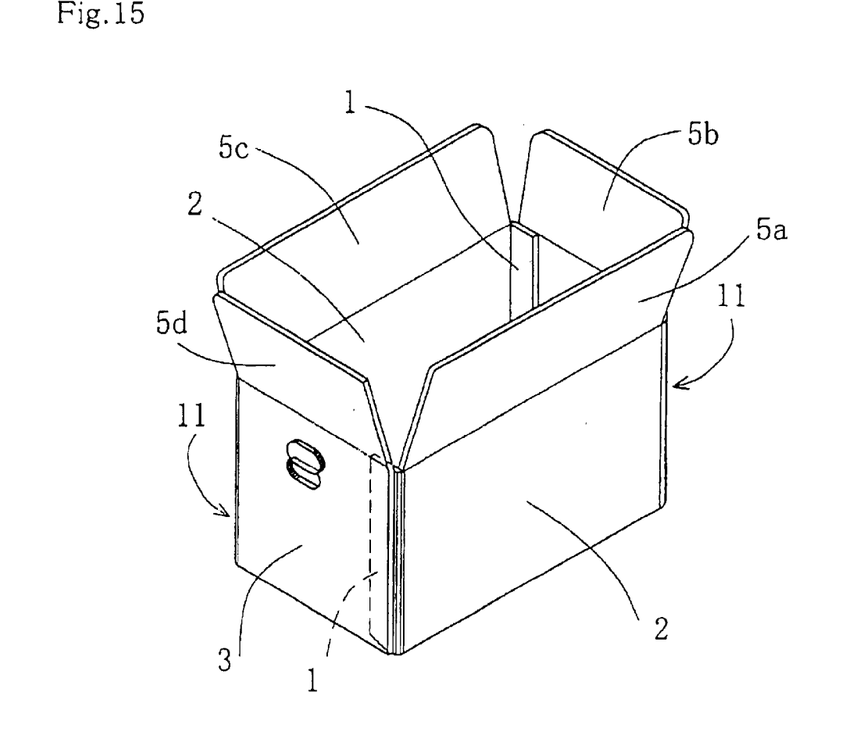
FIG. 15 is a perspective view of the same.

Embodiment 1 of a folding box for packing in accordance with a first invention is a folding box for packing in which a high density foam polypropylene resin board is used for a box forming material, which comprises two box forming bodies (P1) and (P2) including four side walls forming a trunk portion, and which is used as a shuttle box mainly in the physical distribution related field (refer to FIG. 15). A structure of the box forming bodies (P1) and (P2), which are components, will be described below followed by description of a structure for assembling a forming box for packing.

Description of Box Forming Bodies (P1) and (P2) as Components

Figure 3:
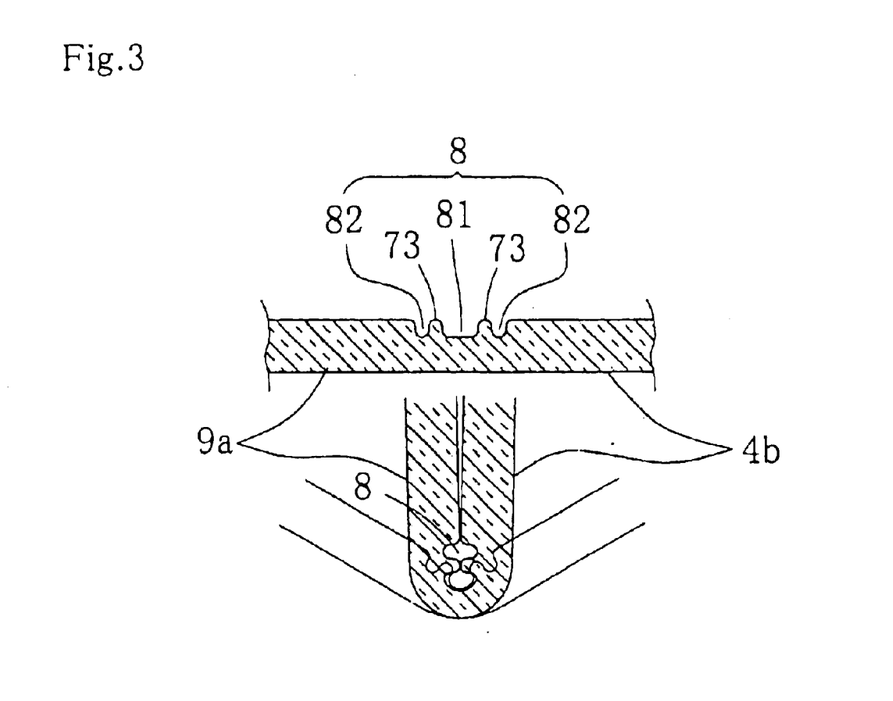
FIG. 3 is partially sectional views of a bottom forming board (4b) of a sub face wall (3), which show an enlarged partial section along a line A—A in FIG. 1 and an enlarged partial section of the bottom forming board (4b) folded into the shape of V.
Figure 4:
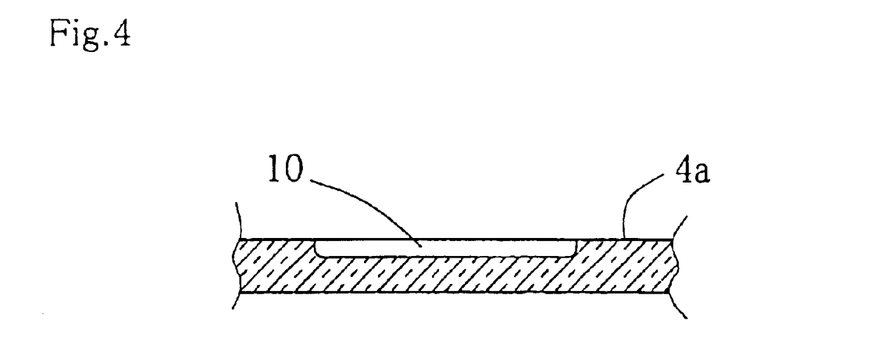
FIG. 4 is a partially sectional view of a bottom forming board (4a) of a main face wall (2), which shows an enlarged partial section along a line B—B in FIG. 1.
Figure 5:
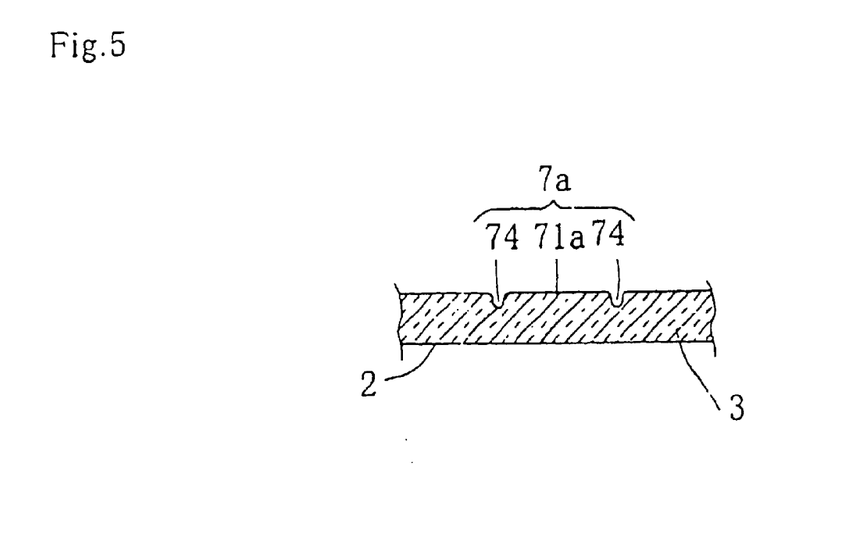
FIG. 5 is partially sectional views of a line for bending into the shape of a mountain (7a) between a main face wall (2) and a sub face wall (3) adjacent to the main face wall (2), which show an enlarged partial section along a line C—C in FIG. 1 and an enlarged partial section of the bent line.
Figure 7:
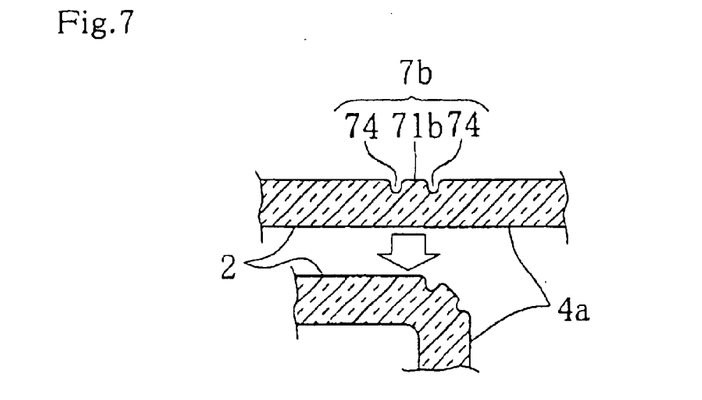
FIG. 7 is partially sectional views of a line for bending into the shape of a mountain (7b) between a main face wall (2) and the bottom forming board (4a), which show an enlarged partial section along a line J—J in FIG. 1 and an enlarged partial section of the bent line.

FIGS. 1 to 7 show box forming bodies (P1) and (P2) and structures of respective portions. FIG. 1 is a front view of one of two unconnected box forming bodies (P1); FIG. 2 is a front view of the other of two unconnected box forming bodies (P2); FIG. 3 is partially sectional views of a bottom forming board (4b) of a sub face wall (3), which show an enlarged partial section along a line A—A in FIG. 1 and an enlarged partial section of the bottom forming board (4b) folded into the shape of a V; FIG. 4 is a partially sectional view of a bottom forming board (4a) extendedly provided to a main face wall (2), which shows an enlarged partial section along a line B—B in FIG. 1; FIG. 5 is partially sectional views of a line for bending into the shape of mountain (7a) between a main face wall (2) and a sub face wall (3) adjacent to the main face wall (2), which show an enlarged partial section along a line C—C in FIG. 1 and an enlarged partial section of the bent line; FIG. 6 is partially sectional views of a line for bending into the shape of a mountain 7c of a cover forming board (5a), which show an enlarged partial section along a line D—D in FIG. 1 and an enlarged partial section of the bent line; and FIG. 7 is partially sectional views of a line for bending into the shape of a mountain (7b) between a main face wall (2) and the bottom forming board (4a), which show an enlarged partial section along a line J—J in FIG. 1 and an enlarged partial section of the bent line.

A folding box for packing in accordance with Embodiment 1 is made from a 3 mm in thickness of high density foam polypropylene resin board in a size of 500×320×320 (mm). Two box forming bodies (P1) and (P2) are connected by a connecting piece (1) extendedly provided to a part of the above bodies to form a trunk portion of the folding box. As shown in FIG. 1, one of the two box forming bodies (P1) and (P2) comprises in series a connecting piece (1), a line for bending into the shape of mountain (7b), a main face wall (2), a line for bending into the shape of a mountain (7a), and a sub face wall (3) in order from the left. Cover forming boards (5a) (5b), which are respectively 160 mm in length to a free end, are extendedly provided to upper edges of the main face wall (2) and the sub face wall (3) through the line for bending into the shape of a mountain (7b). A bottom forming board (4a), which is 300 mm in length to a free end so as to cover almost all over the inner bottom surface in assembling a box and which overlaps a back surface of the later-mentioned folding connecting piece (9a) in assembling, is extendedly provided to a lower edge of the main face wall (2). A 1 mm in depth of concave for fusion (10), which has the shape of an outline of the folding connecting piece (9a), is provided by press on a front surface of the bottom forming board 4a.

A trapezoid bottom forming board (4b), which is 160 mm in length to a free end and has 45 degrees angles respectively from the both ends of a lower edge of the sub face wall (3) in respect with the lower edge, is extendedly provided to the above lower edge through a line for bending into the shape of a mountain (7b). Especially, a folding connecting piece (9a) extended 50 mm in width is extendedly provided through a line for bending into the shape of a V (8) to an inclined portion (6) of the above trapezoid bottom forming board (4b), the inclined portion (6) being adjacent to the bottom forming board (4a) of the main face wall (2) and extending from a place spaced 30 mm from the lower edge along the inclined portion (a remaining base end portion) to the free end.

The second box forming body (P2) of the two box forming bodies (P1) and (P2) comprises in series a connecting piece (1), a line for bending into the shape of a mountain (7b), a main face wall (2), a line for bending into the shape of a mountain (7a), and a sub face wall (3) in order from the left, as shown in FIG. 2. Cover forming boards (5c) (5d), which are respectively in the same size and same shape as those of the first box forming body (P1), are extendedly provided through the lines for bending into the shape of a mountain (7b). A folding connecting piece (9b) is extendedly provided through a line for bending into the shape of a V (8). A trapezoid bottom forming board (4d) is extendedly provided through the line for bending into the shape of mountain (7b) to a lower edge of the sub face wall (3). A bottom forming board (4c), which is 160 mm in length to a free end, is extendedly provided to a lower edge of the above main face wall (2) through the line for bending into the shape of a mountain (7b).

As shown in FIG. 3, in a structure of the line for bending into the shape of a V (8) of the above folding connecting piece (9a), a 2 mm in width of center groove (81) and 1 mm in width of auxiliary grooves (82) provided on the both sides of the center groove (81) are provided parallel around a border line being to be a line for bending with 1 mm width of partitions (73) being respectively provided between the center groove (81) and the auxiliary groove (82) so that the bending member would not interfere each other, while a surface for preventing break (E) is left on the free end side, so that an effect of elastic memory of the high density foam polypropylene resin would be erased. That is, compression of the members inside the bending line is absorbed in spaces formed in the center groove (81) and the auxiliary grooves (82), so that the elastic memory of the high density foam polypropylene resin would be erased.

There are two kinds of structure of the line for bending into the shape of a mountain. In one structure, a 1.5 mm in width of middle groove (72) is provided along a border line, which is to be a line for bending into the shape of a mountain, and 0.8 mm in width of side grooves (74) are provided at the both sides of the center groove (72) with 1 mm in width of partitions (73) being respectively provided between the middle groove (72) and the side groove (74), as shown in FIG. 6. In the other structure, ridges (71a) (71b) are provided between two parallel side grooves (74) along a border line, which is to be a line for bending into the shape of a mountain (7c), as shown in FIG. 5 and FIG. 7. The former structure is applied to the lines for bending into the shape of a mountain (7c) of the upper edges to erase the effect of elastic memory of the high density foam polypropylene resin so that the cover forming boards (5a) (5b) (5c) (5d) would be maintained to open outwardly and to be folded inwardly, while the latter structure is applied to other lines for bending into the shape of a mountain (7a) (7b).

In the line for bending into the shape of mountain (7a), which is located at a place where elastic memory of high density foam polypropylene resin operated on the line for bending into the shape of a mountain (7a) largely influences to increase the volume in folding, especially in the line for bending into the shape of a mountain (7a), which forms a corner (11) in folding (refer to a corner shown by arrows in FIGS. 12 and 13), the width of the ridge (71a) between the above two side grooves (74) is made 6 to 8 mm, around twice as wide as the width of a material board, while the width of the respective ridges (71b) in the other lines for bending into the shape of a mountain (7b) is made narrow so as to be 2 to 4 mm, so that the elastic memory of the high density foam polypropylene resin can be erased. The aforementioned line for bending into the shape of a V (8), as shown in FIGS. 1–3, can also be referred to as a linear region bendable into a shape of a V (8). The linear region (8), and all of its components, constitute a "V" shape when bent.

The reason why the elastic memory of the high density foam polypropylene resin can be erased at the above lines for bending into the shape of a mountain (7a) (7b) (7c) appears to be that the elasticity at the bending portion would be decreased and that the auxiliary grooves (82), the middle groove (72) and/or the side grooves (74) would intercept stretch of the resin.

Description of Folding and Assembling a Folding Box for Packing

Figure 8:
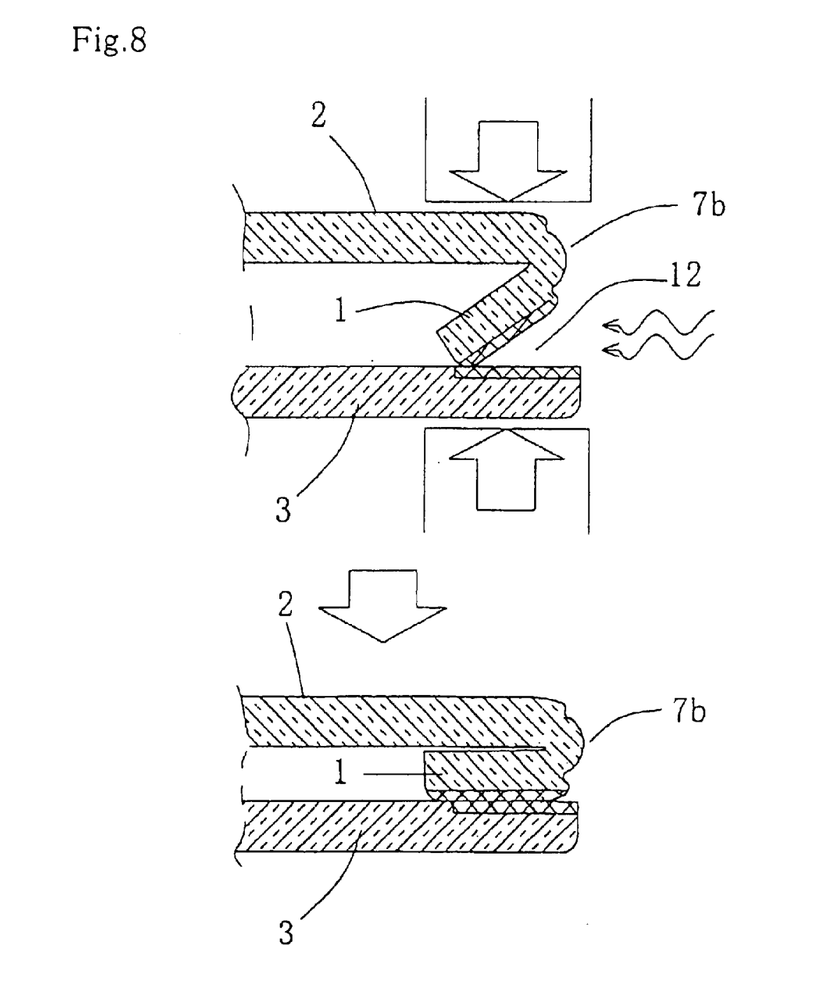
FIG. 8 is enlarged sectional views illustrating connection by fusion between a connecting piece (1) and a sub face wall (3).
Figure 10:
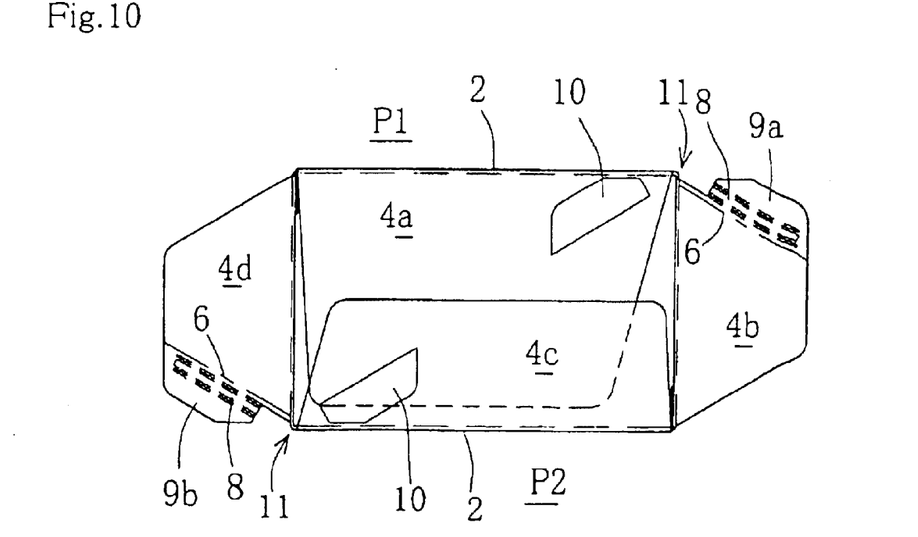
FIG. 10 is a bottom view for illustrating a process of assembling connected two box forming bodies (P1) and (P2) into a three-dimension and building an auto bottom structure by means of bottom forming boards (4a) (4b) (4c) (4d).
Figure 12:
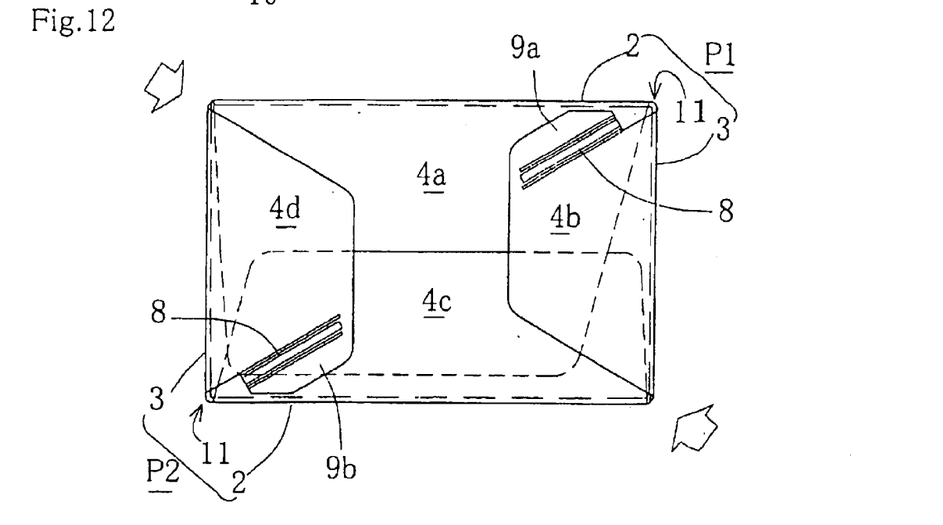
FIG. 12 is a bottom view of a bottom comprising bottom forming boards (4a) (4b) (4c) (4d), which form an auto bottom structure.
Figure 13:
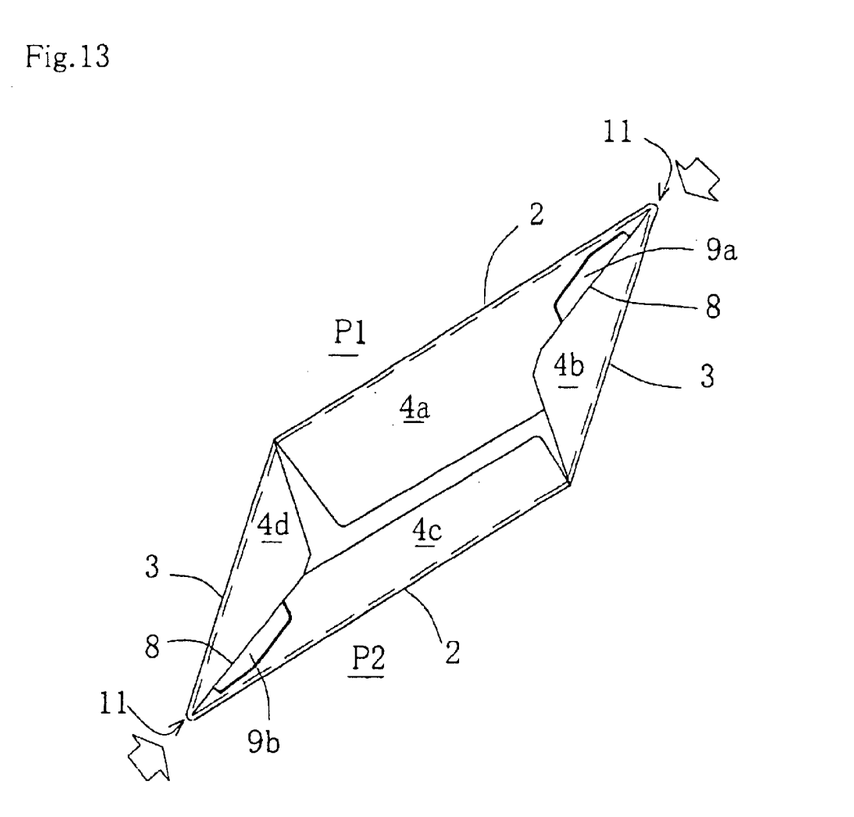
FIG. 13 is a bottom view in the middle stage of folding transformation into a flat shape.
Figure 14:
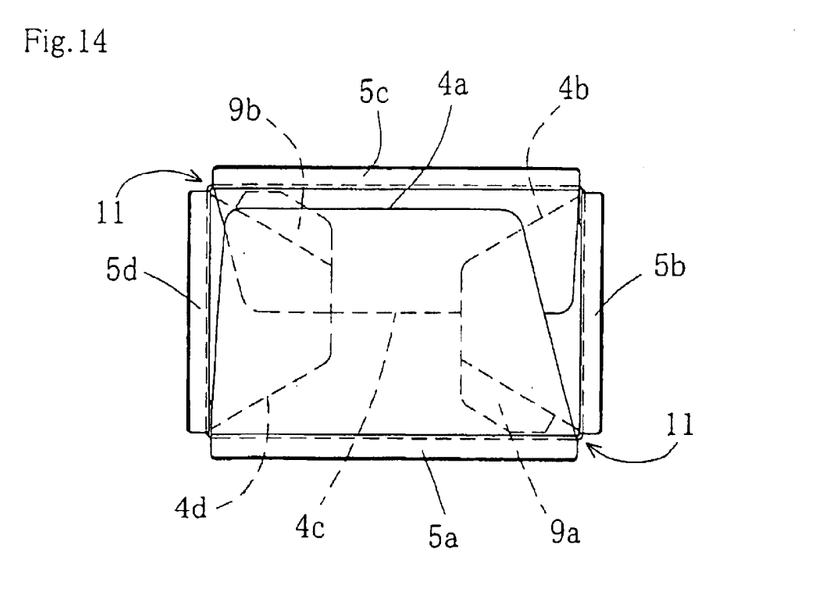
FIG. 14 is a plan view of a folding box for packing, which has been assembled from a flat shape into a three-dimensional shape.
Figure 16:
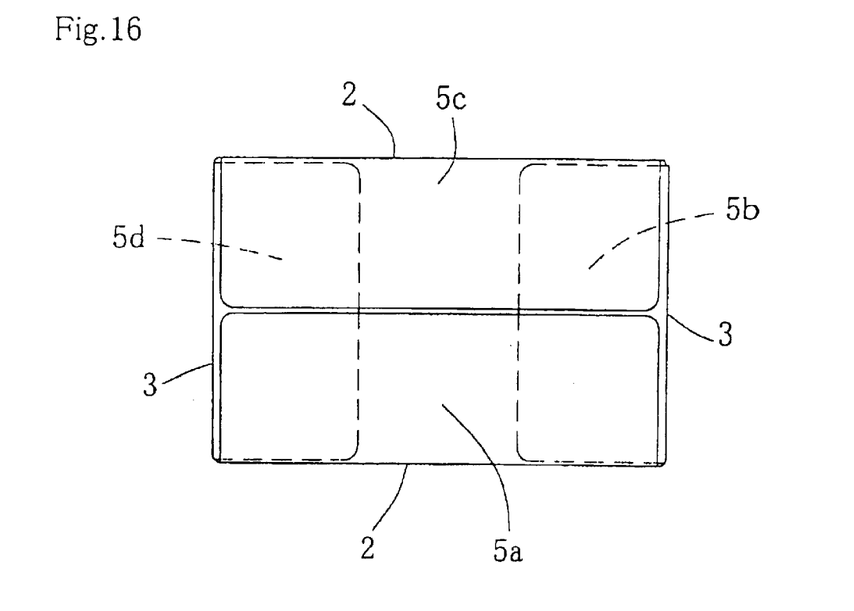
FIG. 16 is a plan view showing cover forming boards (5a) (5b) (5c) (5d) being closed.

Assembly of the above-described box forming bodies (P1) and (P2) will be described with reference to FIGS. 1, 2 and 8 to 16. FIG. 1 is, although the description is overlapped, a front view of one of two unconnected box forming bodies (P1); FIG. 2 is a front view of the other of two unconnected box forming bodies (P2); FIG. 8 is enlarged sectional views illustrating connection by fusion between a connecting piece (1) and a sub face wall (3); FIG. 9 is a front view of two box forming bodies (P1) and (P2) connected by means of a connecting piece (1) into a flat shape; FIG. 10 is a bottom view illustrating a process of assembling the connected two box forming bodies (P1) and (P2) into a three-dimension and building an auto bottom structure by means of bottom forming boards (4a) (4b) (4c) (4d); FIG. 11 is an enlarged sectional view illustrating connection by fusion between a trapezoid bottom forming board (4b) of a sub face wall (3) and a bottom forming board (4a) of a main face wall (2); FIG. 12 is a bottom view of a bottom comprising bottom forming boards (4a) (4b) (4c) (4d), which form an auto bottom structure; FIG. 13 is a bottom view in the middle stage of folding transformation into a flat shape; FIG. 14 is a plan view of a folding box for packing, which has been assembled from a flat shape into a three-dimensional shape; FIG. 15 is a perspective view of the same; and FIG. 16 is a plan view showing cover forming boards (5a) (5b) (5c) (5d) being closed.

First, in order to produce the above-described two box forming bodies (P1) and (P2) made of high density foam polypropylene resin, a punching die in which a punching blade is mounted in advance in the shape of the developed box, for example, is used to punch respective outlines of the box forming bodies (P1) and (P2) shown in FIGS. 1 and 2, and then, predetermined lines for bending into the shape of V (8) and for bending into the shape of a mountain (7a) (7b) (7c) and concaves for fusion (10) are provided at predetermined places by means of a ruled line drawing unit such as a thermal tooth form.

In this case, the places of the upper and lower lines for bending into the shape of a mountain (7c) (7b) of the sub face wall (3), the lines being first bent into the shape of a mountain (7c) (7b) in assembling, are made lower than those of the main face wall (2) by a space (H) almost equal to the thickness of the material board. This is for the purpose of keeping down the elastic memory caused by overlap of a high density foam polypropylene resin board by shifting the bending places.

Second, as shown in FIG. 8, the two box forming bodies (P1) and (P2) are assembled so that a front surface of a connecting piece (1) of the first box forming body (P1) would form a space of a rough V-shaped groove (12) together with a back surface of the sub face wall (3) of the second box forming body (P2). Then, only surfaces to which the upper and lower lines for bending into the shape of a mountain (7c) (7b) of the sub face wall (3) are opposed are blown by hot wind to be heated, and pressure-fused following to the heating. The two box forming bodies (P1) and (P2) are thus transformed into a flat continuous one body, as shown in FIG. 9.

Following to the above, the above connected two box forming bodies (P1) and (P2) in a flat shape are assembled into a three-dimensional square cylinder to be set in an operational cradle (not shown) over which the square cylinder portion of a trunk of the assembled box covers. Then, the bottom forming boards (4a) (4c) of the main face wall (2) are bent toward the inner side in advance and the bottom forming boards (4b) (4d) of the sub face wall (3) are bent toward the front surfaces of the above bottom forming boards (4a) (4c) of the main face walls (2) so as to overlap the bottom forming boards (4a) (4c) of the main face walls (2), as shown in FIG. 10.

As shown in FIG. 11, the folding connecting piece (9a) extendedly provided to the bottom forming board (4b) of the sub face wall (3) is raised up, using a line for bending into the shape of a V (8) as a standard line of rising, so that an angle between a back surface of the above folding connecting piece (9a) and a front surface of the bottom forming board (4a) of the main face wall (2) would be sharp, and so that the so formed space of a rough V-shaped groove (12) would be maintained (shown in FIG. 11). In this condition, only the back surface of the folding connecting piece (9a) and the front surface of the bottom forming board (4a) of the main face wall (2) are blown by hot wind to the extent that surface portions respectively used for adhering are melted, and then, pressure-fused (as shown in FIG. 11) to complete a folding box for packing having an auto bottom structure (refer to FIG. 12).

In the folding box for packing having an auto bottom structure and completed as described above, as shown in FIG. 13, each bottom forming boards (4a) (4b) (4c) (4d) is transformed to cave in the trunk of the box at the lines for bending into the shape of a V (8) between the inclined edges (6) of the bottom forming boards (4b) (4d) of the sub face walls (3) and the folding connecting pieces (9a) (9b) so that the above folding box for packing would be folded into a flat shape when the folding box for packing is pressed in directions shown by arrows in FIG. 12. The volume of the folded box is thus so low that the elastic memory of the high density foam polypropylene resin cannot get the volume back in storage or transportation.

In the case of storing things, when an operator gives a force in directions shown by arrows in FIG. 13, the flat folding box for packing is assembled so that the wide bottom forming boards (4a) (4b) (4c) (4d) would be laid on the inner bottom surface to form a flat bottom, which can be seen from the upper side of the folding box, and so that things can be stored, as shown in FIGS. 14 and 15.

In this case, the cover forming boards (5a) (5b) (5c) (5d) are opened outside the trunk of the box so that an operation of storing things can be carried out. At the end of the operation, the cover forming boards (5b) (5d) of the sub face walls (3) are bent in advance following by bending the cover forming boards (5a) (5c) of the main face walls (2) as shown in the plan view of FIG. 16, and then, the covers are sealed with adhesive tape or the like (not shown).

In order to take out things from the box, the above-mentioned adhesive tape is torn open. The adhesive tape can be taken off without peeling the surface of the box off since the material of the box is high density foam polypropylene resin. Therefore, this folding box can be repeatedly used for a long term under a good condition constantly.

The folding box for packing in accordance with Embodiment 1 described above comprises a set of two box forming bodies (P1) and (P2). It is possible, however, that the box forming bodies (P1) and (P2) respectively shown in FIGS. 1 and 2 are combined to form one box forming body comprising, in order, a first main face wall (21) extendedly provided on one side thereof with a connecting piece (1) for forming a trunk, a first sub face wall (31), a second main face wall (22) and a second sub face wall (32), as shown in FIG. 17 (Embodiment 2). In this case, the same operation and effect can be achieved as in Embodiment 1. As for components of respective portions in Embodiment 2, it is possible to refer to respective detailed illustrations and sectional views of Embodiment 1, in which a folding box for packing comprises the above one set of two box forming bodies (P1) and (P2). Furthermore, since the components of respective portions in Embodiment 2 are same as those in Embodiment 1, the same reference marks can be used and detailed description and drawings of Embodiment 2 is omitted.

What is claimed is:

1. In a folding box for packing made of high density foam polypropylene resin with an auto bottom structure including a first box forming body (P1) and a second box forming body (P2), each of the box forming bodies (P1) (P2) respectively including:

a main face wall (2) having a connecting piece (1) extending from a first lateral side of the main face wall (2);

a sub face wall (3) extending from a second lateral side of the main face wall (2);

a first bottom forming board (4a) (4c) extending from a lower edge of the main face wall (2);

a second bottom forming board (4b) (4d) extending from a lower edge of the sub face wall (3);

a first cover forming board (5a) (5c) extending from an upper edge of the main face wall (2); and a second cover forming board (5b) (5d) extending from an upper edge of the sub face wall (3), wherein the second bottom forming board (4b) (4d) extending from the sub face wall (3) has a side edge adjacent to the first bottom forming board (4a) (4c) extending from the main face wall (2), the side edge being an inclined edge (6) having a 45 degree angle in respect with a border line between the sub face wall (3) and the second bottom forming board (4b) (4d), wherein the first and second box forming bodies (P1) (P2) are mutually connected by heat and pressure-fusion between a back surface of the sub face wall (3) of the first box forming body (P1) and a front surface of the connecting piece (1) of the second box forming body (P2), between a back surface of the sub face wall (3) of the second box forming body (P2) and a front surface of the connecting piece (1) of the first box forming body (P1), between a front surface of the first bottom forming board (4a) of the first box forming body (P1) and a back surface of a first folding connecting piece (9a) of the first box forming body (P1), and between a front surface of the first bottom forming board (4c) of the second box forming body (P2) and a back surface of a second folding connecting piece (9b) of the second box forming body (P2); the improvement comprising:

lines for bending into the shape of a mountain (7c), between the main face wall (2) of the first box forming body (P1) and the first cover forming board (5a) of the first box forming body (P1), between the sub face wall (3) of the first box forming body (P1) and the second cover forming board (5b) of the first box forming body (P1), between the main face wall (2) of the second box forming body (P2) and the first cover forming board (5c) of the second box forming body (P2), and between the sub face wall (3) of the second box forming body (P2) and the second cover forming board (5d) of the second box forming body (P2), including side grooves (74) on both sides of a middle groove (72) through partitions (73), and said side grooves (74) and said middle groove (72) are disposed on an exterior surface of the folding box;

lines for bending into the shape of a mountain (7a), between the main face wall (2) and the sub face wall (3) of each of the first and second box forming bodies (P1) (P2) including two side grooves (74) parallel to a border line and a wide ridge (71a) between the two side grooves (74), a width of the wide ridge (71a) being about twice a thickness of the main face wall (2), and said side grooves (74) and said wide ridge (71a) are disposed on an exterior surface of the folding box; and lines for bending into the shape of a mountain (7b), between the connecting piece (1) of the first box forming body (P1) and the main face wall (2) of the first box forming body (P1), between the connecting piece (1) of the second box forming body (P2) and the main face wall (2) of the second box forming body (P2), between the main face wall (2) of the first box forming body (P1) and the first bottom forming board (4a) of the first box forming body (P1), between the main face wall (2) of the second box forming body (P2) and the first bottom forming board (4c) of the second box forming body (P2), between the sub face wall (3) of the first box forming body (P1) and the second bottom forming board (4b) of the first box forming body (P1), and between the sub face wall (3) of the second box forming body (P2) and the second bottom forming board (4d) of the second box forming body (P2), including two side grooves (74) parallel to a border line and a narrow ridge (71b) between the two side grooves (74), and said side grooves (74) and said narrow ridge (71b) are disposed on an exterior surface of the folding box, wherein the inclined edge (6) includes the first folding connecting piece (9a) and the second folding connecting piece (9b) having a linear region bendable into the shape of a V (8) for reducing an effect of elasticity of the high density foam polypropylene resin occurring in folding, wherein a concave for fusion (10) having the high density foam polypropylene resin at a reduced thickness in the shape of an outline of the folding connecting piece (9a) (9b) is formed on a front surface of the first bottom forming board (4a) (4c), the front surface of the first bottom forming board (4a) (4c) overlapping the back surface of the folding connecting piece (9a) (9b) in assembling, and wherein the back surface of the folding connecting piece (9a) (9b) is fused on a surface of the concave for fusion (10) in assembling.

2. In a folding box for packing made of high density foam polypropylene resin with an auto bottom structure including one box forming body (P3), the box forming body (P3) including:

a first main face wall (21);

a connecting piece (1) extending from a first lateral side of the first main face wall (21);

a first cover forming board (5a) extending from an upper edge of the first main face wall (21);

a first bottom forming, board (4a) extending from a lower edge of the first main face wall (21);

a first sub face wall (31) extending from a second lateral side of the first main face wall (21);

a second cover forming board (5b) extending from an upper edge of the first sub face wall (31);

a second bottom forming board (4b) extending from a lower edge of the first sub face wall (31);

a second main face wall (22) extending from a lateral side of the first sub face wall (31);

a third cover forming board (5c) extending from an upper edge of the second main face wall (22);

a third bottom forming board (4c) extending from a lower edge of the second main face wall (22);

a second sub face wall (32) extending from a lateral side of the second main face wall (22);

a fourth cover forming board (5d) extending from an upper edge of the second sub face wall (32); and a fourth bottom forming board (4d) extending from a lower edge of the second sub face wall (32), the second bottom forming board (4b) having a side edge made to be a first inclined edge (6a) having a 45 degree angle in respect with the lower edge of the first sub face wall (31), the fourth bottom forming board (4d) having a side edge made to be a second inclined edge (6b) having a 45 degree angle in respect with the lower edge of the second sub face wall (32), wherein the box forming body (P3) is connected by beat and pressure-fusion between a front surface of the connecting piece (1) and a back surface of the second sub face wall (32), between a front surface of the first bottom forming board (4a) and a back surface of the first folding connecting piece (9a), and between a front surface of the third bottom forming board (4c) and a back surface of the second folding connecting piece (9b); the improvement comprising:

lines for bending into the shape of a mountain (7c), between the first main face wall (21) and the first cover forming board (5a), between the first sub face wall (31) and the second cover forming board (5b), between the second main face wall (22) and the third cover forming board (5c), and between the second sub face wall (32) and the fourth cover forming board (5d), including side grooves (74) on both sides of a middle groove (72) through partitions (73), and said side grooves (74) and said middle groove (72) are disposed on an exterior surface of the folding box, lines for bending into the shape of a mountain (7b), between the connecting piece (1) and the first main face wall (21), between the first sub face wall (31) and the second main face wall (22), between the first main face wall (21) and the first bottom forming board (4a), between the first sub face wall (31) and the second bottom forming board (4b), between the second main face wall (22) and the third bottom forming board (4c), and between the second sub face wall (32) and the fourth bottom forming board (4d), including two side grooves (74) parallel to a border line and a narrow ridge (71b) between the two side grooves (74), and said side grooves (74) and said narrow ridge (71b) are disposed on an exterior surface of the folding box; and lines for bending into the shape of a mountain (7a), between the first main face wall (21) and the first sub face wall (31), and between the second main face wall (22) and the second sub face wall (32), including two side grooves (74) parallel to a border line and a wide ridge (71a) between the two side grooves (74), a width of the wide ridge (71a) being about twice a thickness of the main face wall (21), and said side grooves (74) and said wide ridge (71a) are disposed on an exterior surface of the folding box, wherein the first inclined edge (6a) is extendedly provided with a first folding connecting piece (9a), and the second inclined edge (6b) is extendedly provided with a second folding connecting piece (9b), the first and second folding connecting pieces (9a) (9b) each having a linear region bendable into the shape of a V (8) for reducing an effect of elasticity of the high density foam polypropylene resin occurring in folding, wherein a first concave for fusion (10) having the high density foam polypropylene resin at a reduced thickness in the shape of an outline of the first folding connecting piece (9a) is formed on a front surface of the first bottom forming board (4a), the front surface of the first bottom forming board (4a) overlapping the back surface of the first folding connecting piece (9a) in assembling, wherein a second concave for fusion (10) having the high density foam polypropylene resin at a reduced thickness in the shape of an outline of the second folding connecting piece (9b) is formed on a front surface of the third bottom forming board (4c), the front surface of the third bottom forming board (4c) overlapping the back surface of the second folding connecting piece (9b) in assembling, wherein the back surface of the first folding connecting piece (9a) is fused on a surface of the first concave for fusion (10) in assembling, and wherein the back surface of the second folding connecting piece (9b) is fused on a surface of the second concave for fusion (10) in assembling.

* * * * *